(12) United States Patent
Di Gregorio et al.

(10) Patent No.: US 8,108,862 B2
(45) Date of Patent: Jan. 31, 2012

(54) OUT-OF-ORDER THREAD SCHEDULING BASED ON PROCESSOR IDLE TIME THRESHOLDS

(75) Inventors: Lorenzo Di Gregorio, Pescara (IT); Jinan Lin, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 1293 days.

(21) Appl. No.: 11/298,935

(22) Filed: Dec. 12, 2005

(65) Prior Publication Data

US 2006/0156306 A1 Jul. 13, 2006

(30) Foreign Application Priority Data

Dec. 13, 2004 (DE) .................. 10 2004 059 972

(51) Int. Cl.
*G06F 9/46* (2006.01)
(52) U.S. Cl. ....................................................... 718/102
(58) Field of Classification Search .................. 718/102, 718/108
See application file for complete search history.

(56) References Cited

U.S. PATENT DOCUMENTS

| | | | | |
|---|---|---|---|---|
| 4,625,081 A * | 11/1986 | Lotito et al. | ............... | 379/88.26 |
| 6,243,736 B1 | 6/2001 | Diepstraten et al. | | |
| 6,697,935 B1 * | 2/2004 | Borkenhagen et al. | ....... | 712/228 |
| 6,931,641 B1 * | 8/2005 | Davis et al. | .................... | 718/108 |
| 2002/0004966 A1 * | 1/2002 | Wakat et al. | ............... | 15/257.06 |
| 2002/0007387 A1 * | 1/2002 | Ginsberg | ...................... | 709/102 |
| 2002/0138717 A1 * | 9/2002 | Joy et al. | ........................ | 712/235 |
| 2002/0156999 A1 | 10/2002 | Eickemeyer et al. | | |
| 2003/0097547 A1 | 5/2003 | Wishneusky | | |
| 2003/0097548 A1 | 5/2003 | Wishneusky | | |
| 2005/0022196 A1 | 1/2005 | Davis et al. | | |
| 2006/0048160 A1 * | 3/2006 | Olszewski et al. | ............ | 718/105 |

FOREIGN PATENT DOCUMENTS

DE   101 10 504 A1   10/2001

OTHER PUBLICATIONS

Skutella et al., "Scheduling Precedence-Constrained Jobs with Stochastic Processing Times on Parallel Machines", SODA '01 Proceedings of the twelfth annual ACM-SIAM symposium on Discrete algorithms, pp. 589-590, 2001.*
Brinkschulte, U. (1999)."A Multithreaded Java Microcontroller for Thread-Oriented Real-Time Event-Handling," International Conference on Parallel Architectures and Compilation Techniques (PACT99), 6 pages.
Chekuri, C. et al. (2001). "Approximation Techniques for Average Completion Time Scheduling," *Society for Industrial and Applied Mathematics Journal on Computing* 31(1):146-166.
Lüth, K. et al. (1997). "The EVENTS Approach to Rapid Prototyping for Embedded Control Systems," *Zielarchitecturen Eigebetteter Systeme* 14, ITG/GI Fachtagung Architectur von Rechnersystemen, 9 pages.

(Continued)

*Primary Examiner* — Meng An
*Assistant Examiner* — Brian Chew
(74) *Attorney, Agent, or Firm* — Slater & Matsil, L.L.P.

(57) ABSTRACT

The invention relates to a device to be used with a thread scheduling method, and to a thread scheduling method comprising the steps of performing a scheduling for threads to be executed by a multithreaded (MT) processor (11), characterized in that the scheduling is performed as a function of a variable (idle) representing the processor idle time.

19 Claims, 7 Drawing Sheets

OTHER PUBLICATIONS

Mikschl, A. et al. (1996). "MSparc: A Multithreaded Sparc," *in* Euro-Par vol. II, pp. 461-469.

MIPS Technologies, Inc. (2003)."Multi-Threading Extensions to MIPS® Architecture," MIPS Technologies, Inc., 35 pages.

Peha, J. M. (1995). "Heterogeneous-Criteria Scheduling: Minimizing Weighted Number of Tardy Jobs and Weighted Completion Time," *Journal of Computers and Operations Research* 22(10):1089-1100.

Ubicom™ "IP3000™ Family Processors: Performance to Spare for Advanced Wireless Networking Applications," located at<http://ubicom.com/processors/ip3000/ip3000_family.html> visited on Jun. 6, 2006. (2 pages).

Uetz, M. (2001). "Algorithms for Deterministic and Stochastic Scheduling," Dissertation, Technischen Universität Berlin, 175 pages.

Uetz, M. (2002). "When Greediness Fails: Examples from Stochastic Scheduling," *Research Memoranda 067*, Maastricht: METEOR, Maastricht Research School of Economics of Technology and Organization, 6 pages.

Vieira, S. L. et al. (1994). "On-line Sporadic Task Scheduling in Hard Real-Time Systems," *In* Proceedings of the Sixth Euromicro Workshop on Real-Time Systems, Vaesteraas, Sweden, 6 pages, and Abstract located at <http://ieeexplore.ieee.org/xpl/absprintf.jsp?arnumber=336844> visited on Aug. 16, 2005.

\* cited by examiner

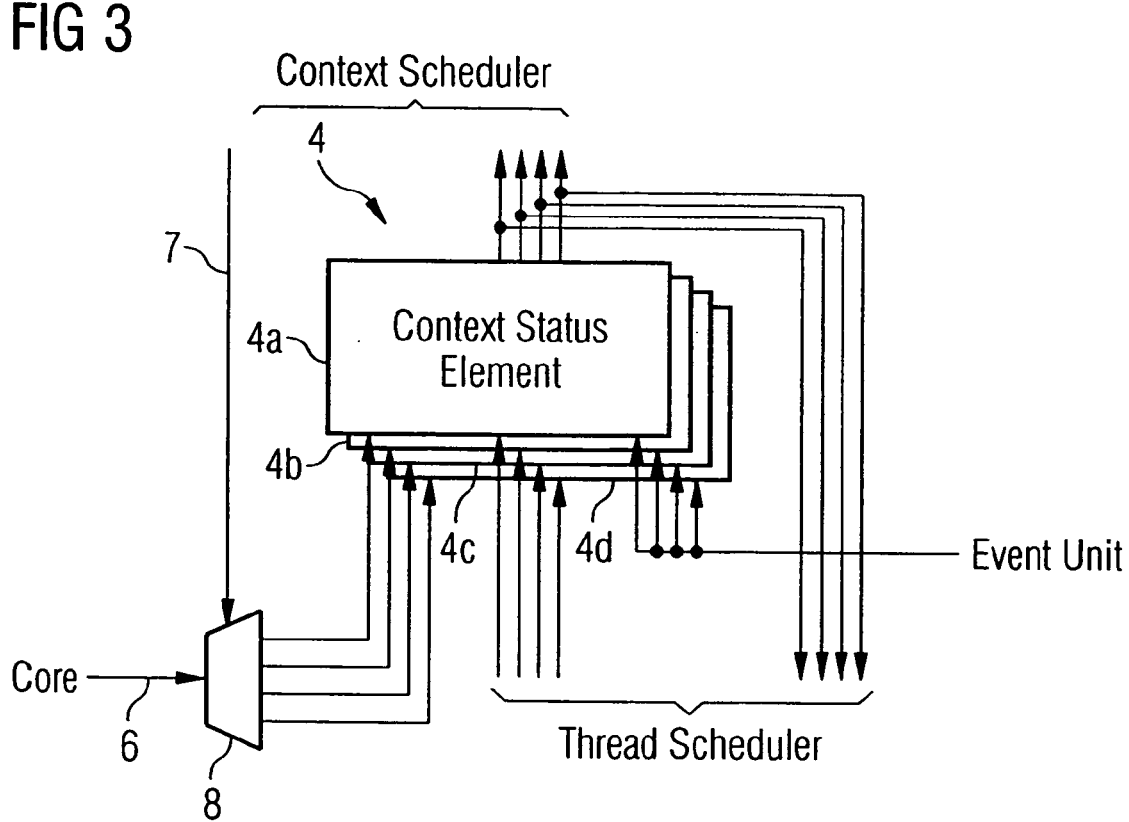
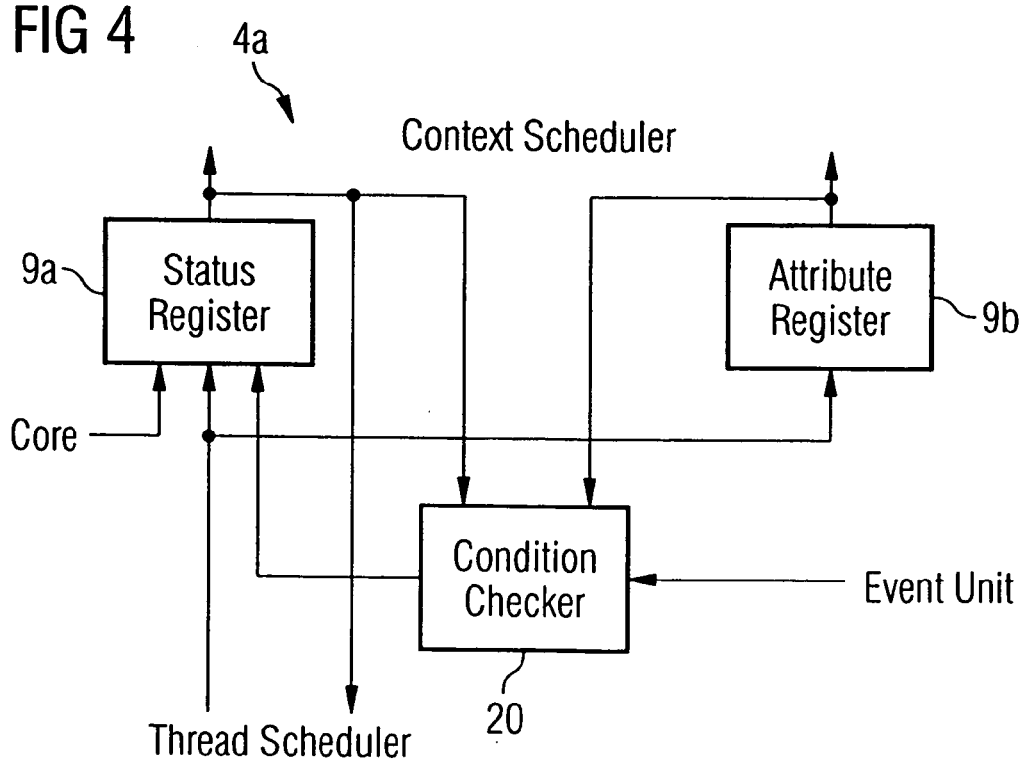

FIG 9

Process 1: Select the Next Free Context if there exist an "i" such that context [i].free="true", then
    free_ctx_valid="true"
    free_ctx=i
else
    free_ctx_valid="false"

Process 2: Assign a Thread to the Next Free Context if next_to_go="out-of-order" and free_ctx_valid="true", then
    context [free_ctx].attributes=scheduled.attributes
    context [i].free="false"
    Delete entry scheduled.adr from the Thread List
    (use scheduled.prev to access the previous entry).

if next_to_go="in-order" and free_ctx_valid="true", then
    context [free_ctx].attributes=list_base.attributes
    context [i].free="false"
    Delete entry list_base.adr from the Thread List
    assign list_base.adr to the subsequent entry in the Thread List

Process 3: Pass Events to Running Threads if an event arrives, then compute for all "i"
    context [i].attributes=f(context [i].attributes, event)

if context [i].attributes contains a "thread terminated" message, then
    context [i].free="true"

OUT-OF-ORDER THREAD SCHEDULING BASED ON PROCESSOR IDLE TIME THRESHOLDS

CLAIM FOR PRIORITY

This application claims the benefit of priority to German Application No. 10 2004 059 972.6, filed in the German language on Dec. 13, 2004, the contents of which are hereby incorporated by reference.

TECHNICAL FIELD OF THE INVENTION

The invention relates to a thread scheduling method and to a device to be used with a thread scheduling method.

BACKGROUND OF THE INVENTION

Conventional digital computing circuits (e.g. corresponding microcontroller or microprocessor systems arranged on a microchip) comprise one or a plurality of (central) control or processing units (Central Processing Units (CPUs), or CPU, "cores").

The CPU or the CPUs are—via a system bus (and possibly one or a plurality of further bus systems)—connected with one or a plurality of (external or internal) memories, e.g. a program and a data memory ("program memory" and "data memory").

The "program memory" comprises in particular the sequence of the commands to be processed by the CPU core(s), i.e. the program (and possibly additionally corresponding data constants to be used by the CPU core(s)).

The program memory may, for instance, be an EPROM (Erasable PROM) or an EEPROM (Electrically Erasable PROM), in particular a flash EEPROM device.

Thus, it can be achieved that the program remains stored on the corresponding memory even if the current supply is interrupted.

For programs that are to be changed frequently, RAMs (RAM=Random Access Memory or write-read memory), in particular DRAMs, may, for instance, also be—alternatively—used as program memories that are adapted to be loaded from an external mass storage.

In the above-mentioned "data memory", the variables which are possibly to be modified in particular by the CPU core(s) during the execution of the program may be stored.

The data memory may, for instance, be composed of one or a plurality of RAM devices, in particular e.g. an appropriate DRAM device (DRAM=Dynamic Random Access Memory) or SRAM device (SRAM=Static Random Access Memory).

A software program (or several such programs) to be processed by the CPU core may be subdivided into a plurality of appropriate software tasks (threads).

This has, for instance, the advantage that—in particular e.g. in the case of so-called multithreaded (MT) microcontroller or microprocessor systems—a plurality of different tasks each may be loaded in parallel into one and the same CPU core and be processed there.

By means of multithreaded (MT) microcontroller or microprocessor systems, particular resources—in particular e.g. the execution pipeline (processing pipeline)—can be utilized more efficiently.

Clock times in which there is a delay in a particular thread loaded into the CPU core for certain reasons may be used for processing a further thread loaded into the CPU core in parallel.

For storing the status or "context", respectively, of—possibly a plurality of—threads loaded into the CPU core, microcontroller or microprocessor system elements such as program counter (PC), execution status register, register file, etc., etc. are possibly present several times over.

Thus, a plurality of different threads can be kept simultaneously in one and the same CPU core, and appropriate switching between the threads can be performed.

Usually, only a small portion of the respective threads to be executed is loaded simultaneously into the CPU core; the remaining threads to be executed are buffered outside the CPU core until they are loaded into the CPU core.

The scheduling of the threads thus takes place in two steps: In a first scheduling step it is decided when which threads (that are buffered outside the CPU core and) that are scheduled for execution are loaded into the CPU core ("off-core thread scheduling" or "thread scheduling"). In a second subordinated step it is decided when which of the threads that have been loaded into the CPU core has to be executed ("on-core thread scheduling" or "context scheduling").

For both scheduling steps, respectively different scheduling strategies may be used. It may, for instance, be an object of the "context scheduling" to use the processor resources as optimally as possible, and an object of the "thread scheduling" to achieve an overall performance that is as high as possible (e.g. a high throughput, or short latency times, etc.).

In the case of conventional multithreaded (MT) microcontroller or microprocessor systems, the "context scheduling" is usually controlled by hardware and the "thread scheduling" by software.

Software-controlled "thread scheduling" entails an allocation of processor resources by the corresponding thread scheduling program, and accordingly losses in the overall performance of the microcontroller or microprocessor system.

SUMMARY OF THE INVENTION

It is an object of the invention to provide a novel thread scheduling method and a novel device to be used with a thread scheduling method.

In accordance with a first aspect of the invention there is provided a thread scheduling method comprising the steps of:
performing a scheduling for threads to be executed by a multithreaded (MT) processor,
characterized in that the scheduling is performed as a function of a variable (idle) representing the processor idle time.

In a particularly advantageous embodiment of the invention, a thread may be subject to an early scheduling if the variable (idle) representing the processor idle time is larger than an idle time threshold value (scheduled.threshold) assigned to the thread, and if a thread that is preceding said thread in the thread list is not yet in a ready status.

By appropriate selection of the idle time threshold value it may be prevented that the thread which is following the thread that is preceding in the thread list and is not yet ready is subject to an "early" scheduling. It has, in particular, turned out that the acceptance of a short idle time—until the preceding thread has possibly changed to a ready status and is then subject to a scheduling possibly prior to the following thread as a rule results in a correspondingly better overall performance than an immediate scheduling of the following thread in the case of a non-ready preceding thread.

It is of particular advantage if the (following) thread is subject to an early scheduling if it is—other than the thread preceding said thread in the thread list—in a ready status.

In a particularly preferred embodiment of the invention, the variable (idle) representing the processor idle time is incremented if the processor is in a stall status and/or if a free context is available.

In accordance with a further aspect of the invention there is provided a device to be used with a thread scheduling method, wherein a scheduling is performed for threads that are to be executed by a multithreaded (MT) processor, characterized in that the device comprises an idle time counter for performing the thread scheduling as a function of a variable (idle) representing the processor idle time and measured by the idle time counter.

It is of advantage if the above-mentioned device is implemented in hardware.

BRIEF DESCRIPTION OF THE DRAWINGS

In the following, the invention will be explained in more detail by means of embodiments and the enclosed drawing. The drawing shows:

FIG. 3 a schematic representation of a plurality of context status elements stored in the context status array memory illustrated in FIG. 2;

FIG. 4 a schematic representation of one of the context status elements illustrated in FIG. 3;

FIG. 9 a schematic representation of processes performed by the thread scheduler illustrated in FIG. 6.

DETAILED DESCRIPTION OF THE INVENTION

Figure 1:
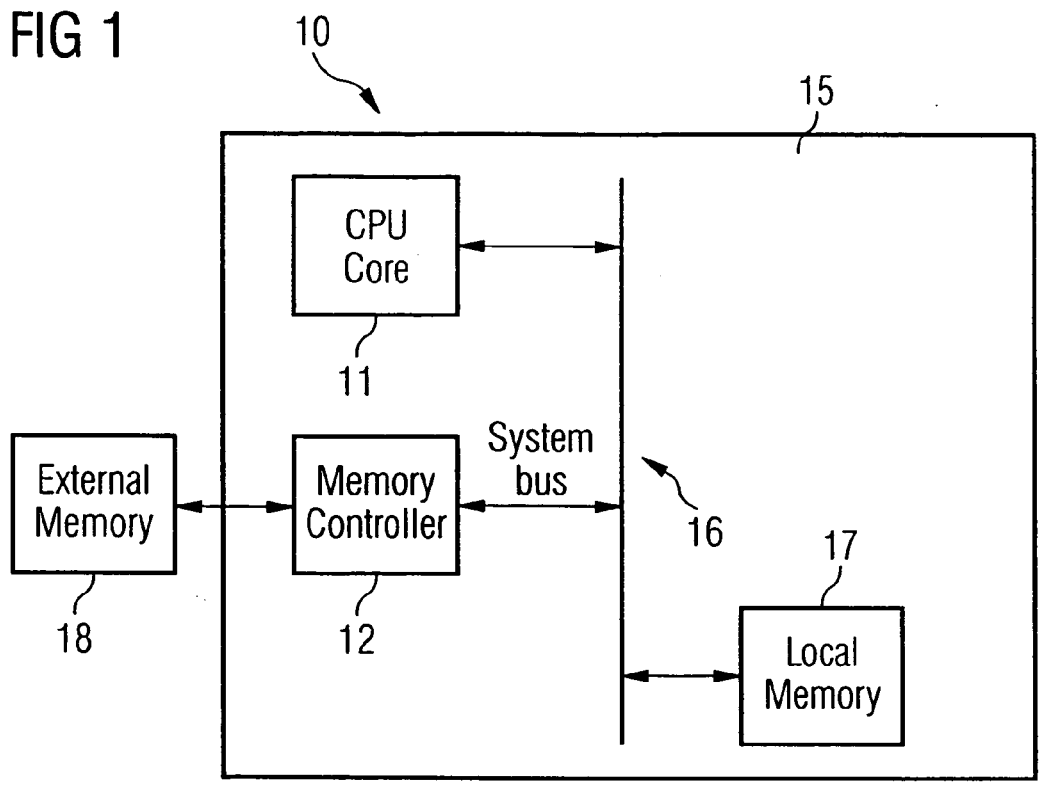
FIG. 1 a schematic, simplified representation of a microcontroller or microprocessor system according to an embodiment of the present invention.

FIG. 1 shows a schematic representation of a microcontroller or microprocessor system 10 according to an embodiment of the invention.

The microcontroller or microprocessor system 10 may, for instance, be an 8 bit microcontroller or microprocessor system 10, or any other microcontroller or microprocessor system, e.g. an appropriate 16 bit, 32 bit, or 64 bit microcontroller or microprocessor system, etc., in particular a multithreaded (MT)microcontroller or microprocessor system.

The microcontroller or microprocessor system 10 comprises one or a plurality of (central) control or processing units 11 (Central Processing Units (CPUs) or CPU "cores", respectively) arranged on a corresponding microchip 15.

The CPU 11 is or the CPUs are—via a system bus 16 (and possibly one or a plurality of further bus systems)—connected with one or a plurality of internal memories 17 (provided on the same microchip 15 as the CPU 11), and—e.g. via the system bus 16 and one or a plurality of corresponding memory controllers 12—with one or a plurality of external memories 18 (provided on a different microchip than the CPU 11).

The memories 17, 18 may, for instance, act as "program memory" and/or "data memory".

The "program memory" contains in particular the sequence of the commands to be executed by the CPU(s) 11, i.e. the program (and possibly additional corresponding data constants to be used by the CPU(s) 11).

The program memory—that is e.g. formed by the memory 17—may, for instance, be an EPROM (Erasable PROM) or an EEPROM (Electrically Erasable PROM), in particular a flash EEPROM device.

Thus, it can be achieved that the program remains stored on the corresponding memory even if the current supply is interrupted.

For programs that are to be changed frequently, RAMS (RAM=Random Access Memory or read-write memory), in particular DRAMS, may, for instance, also be—alternatively—used as program memories that are adapted to be loaded from an external mass storage.

In the above-mentioned "data memory"—that is e.g. formed by the memory 18—the variables—which possibly have to be modified by the CPU(s) 11 during the execution of the program—may, for instance, be stored.

The data memory may e.g. be composed of one or a plurality of RAM devices, in particular e.g. by an appropriate DRAM device (DRAM=Dynamic Random Access Memory) or SRAM device (SRAM=Static Random Access Memory).

A software program (or a plurality of such programs)—to be executed by the CPU or the CPU core 11—may be subdivided into a plurality of corresponding software tasks (threads).

This, for instance, has the advantage that—in particular in the case of the multithreaded (MT) microcontroller or microprocessor system 10 illustrated here—a plurality of different tasks each can be loaded into the CPU core 11 simultaneously and can be processed there.

For storing the status or "context" of—possibly several—threads loaded into the CPU core 11, particular elements such as program counter (PC), execution status register, stack pointer, register file, etc., etc. are possibly present several times with the CPU core 11 (e.g. twice, three times, four times, or five times, etc.).

Each thread is assigned with a set of status elements referred to as thread context. By this, and by the multiple providing of the above-mentioned elements, a plurality of different threads (e.g. two, three, four, or five threads, etc.) can be loaded simultaneously into the CPU core 11, and appropriate switching can be performed between the threads.

This way, particular processor resources—in particular e.g. the execution pipeline (processing pipeline)—can be used more efficiently; the execution pipeline is adapted to simultaneously process commands assigned to different threads.

For instance, clock times in which there is a delay in a particular thread loaded into the CPU core 11 for certain reasons, may be used for processing a further thread loaded into the CPU core in parallel.

As will be explained in more detail in the following, only a (small) part of the respective threads to be executed is, as a rule, loaded simultaneously into the CPU core 11; the remaining threads to be executed are buffered outside the CPU core 11 (and are, to this end, for instance, read out from the memory 17 and stored—for buffering—in a memory 2e provided in the vicinity of the CPU core 11) until they are loaded into the CPU core 11.

The scheduling of the threads is thus performed in two steps: In a first scheduling step it is decided when which threads (that are buffered outside the CPU core 11 and) that are scheduled for execution are loaded into the CPU core 11 ("off-core thread scheduling" or "thread scheduling", e.g. by means of a thread list scheduler 2 implemented in hardware and illustrated in FIG. 2).

Figure 2:
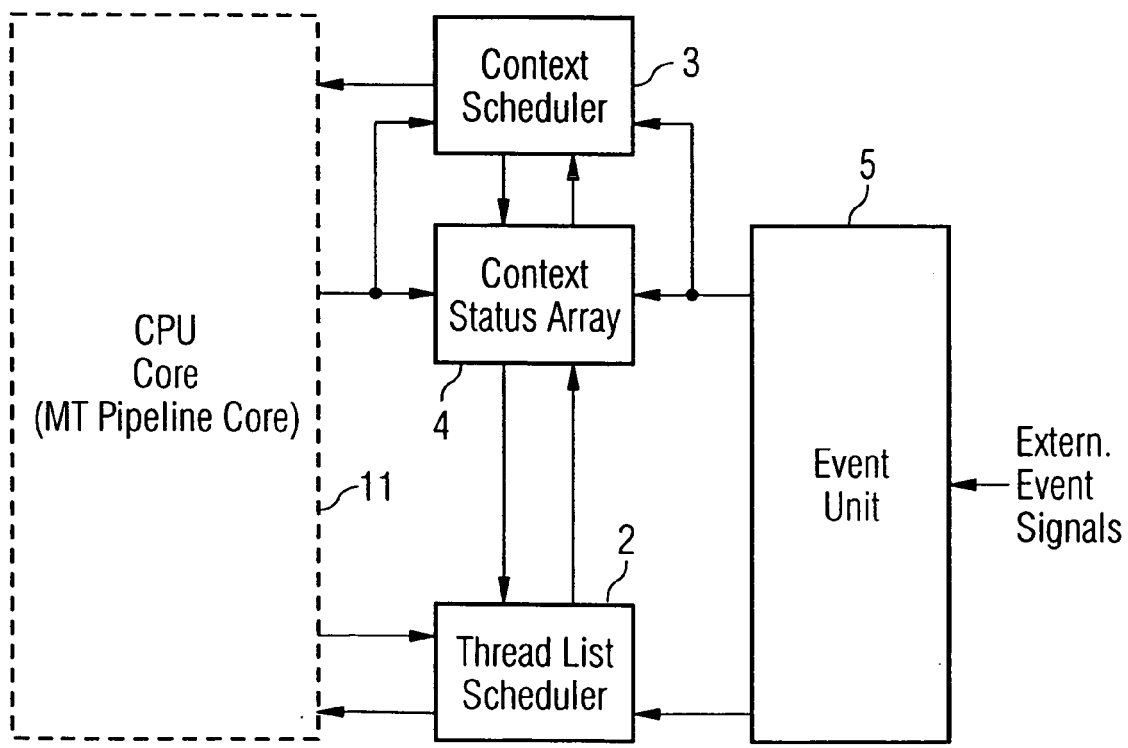
FIG. 2 a schematic representation of devices used with a thread scheduling with the microcontroller or microprocessor system illustrated in FIG. 1.

In a second subordinated step it is decided when which of the threads that have been loaded into the CPU core 11 has to be executed ("on-core thread scheduling" or "context scheduling", e.g. by means of a context scheduler 3 also implemented in hardware and illustrated in FIG. 2).

A thread to be executed by the CPU core 11 may be in the following statuses:
1. "unavailable": thread not ready for starting
2. "available": thread ready for starting
3. "running": Corresponding commands are fetched and executed for the thread by the execution pipeline
4. "suspended": execution of the thread discontinued
5. "ready": thread ready for starting or for continuing execution, respectively
6. "terminated": execution terminated The first two statuses ("unavailable" and "available") are off-core statuses; the further statuses "running", "suspended", "ready" are on-core statuses and constitute, from an off-core view (i.e. for the thread list scheduler 2) one and the same status, namely "loaded": The thread is loaded into the CPU core 11.

In the CPU core 11, only one single thread each can be in the status "running".

The context scheduler 3—responsible for the "on-core thread scheduling" or "context scheduling", respectively—requires—for every on-core thread—information with respect to the current context status and attribute information (e.g. with respect to thread priority, pre-emption and suspend/recovery property, etc.).

This information is stored in a context status array memory 4 that is also illustrated in FIG. 2.

The context status array memory 4 forms the interface between the context scheduler 3 and the thread list scheduler 2.

A change of the context status information data stored in the context status array memory 4 can be triggered by events taking place internally in the CPU core 11, or by external events.

A context which is initially marked by corresponding data in the context status array memory 4 as being in the status "running" may, for instance, when the thread e.g. has to wait for a coprocessor access, be marked as being in the status "suspended" by changing the corresponding data in the context status array memory 4.

When the coprocessor has responded, the context marked as being in the status "suspended" by corresponding data in the context status array memory 4 can—by changing the corresponding data in the context status array memory 4—be marked as being in the status "ready", etc., etc.

Correspondingly similar, e.g. a context which is initially marked by corresponding data in the context status array memory 4 as being in the status "running" may, for instance, when the thread has been executed completely, be marked as being in the status "terminated" by changing the corresponding data in the context status array memory 4, etc., etc.

The thread list scheduler 2 manages—as will be explained in more detail in the following—a list with off-core threads and establishes a connection between a thread and a context if a corresponding, free context is available (and possibly further—e.g. idle time-dependent—preconditions have been met, cf. below).

If the thread list scheduler 2 loads a corresponding thread into the CPU core 11, the attribute information for the newly loaded thread is stored by the thread list scheduler 2 in the context status array memory 4, and the corresponding status data are updated such that the thread is then marked as being in the status "ready" in the context status array memory 4. In the meantime, the thread list scheduler 2 writes the starting address of the newly loaded thread into the corresponding program counter (PC).

The above-mentioned list with off-core threads managed by the thread list scheduler 2 contains the above-mentioned (thread) starting address, the starting conditions, the attribute information, and the current status ("unavailable", "available", or "loaded")—seen from an off-core view.

A change of the thread status of a thread contained in the list with off-core threads can—similarly as explained above for on-core thread status data—be triggered by events taking place internally in the CPU core 11, or by external events (a change of status from "unavailable" to "available" may, for example, be triggered if corresponding conditions have been met, e.g. if all preceding threads related to a corresponding thread have been loaded or executed completely (internal triggering), or e.g. if a corresponding external resource assigned to the thread is ready for starting (external triggering)).

In order to perform a scheduling for a thread that is in the status "available" (with a loading of the thread into the CPU core 11 taking place, cf. above), the status of all available contexts stored in the context status array memory 4 is queried by the thread list scheduler 2, and it is in particular determined whether a free context—that is not occupied by a corresponding thread—is available. In addition—as will be explained in more detail below—, a scheduling may be made dependent on further conditions taking e.g. into consideration the processor idle time, etc.

External signals indicating the above-mentioned (and possibly further) external events are supplied centrally to an event controller 5 and converted to corresponding internal control signals which control the thread list scheduler 2, the context scheduler 3, and the context status array memory 4 appropriately (e.g. as explained above), said internal control signals being transmitted by the event controller 5 to the context scheduler 3 or the context status array memory 4, respectively.

As is illustrated in FIG. 3, a plurality of context status elements 4a, 4b, 4c, 4d (CSE) are stored in the context status array memory 4, said context status elements each comprising—related to one respective context—information concerning the current context status and attribute information (e.g. with respect to thread priority, pre-emption and suspend/recovery property etc.).

Signals available at a line 6 and generated by the CPU core 11, which are to effect an updating of the context status are transmitted by means of a multiplexer 8 that is controlled by the context scheduler 3 via a line 7 to the context status element 4a, 4b assigned to the currently running context (in particular by applying a control signal indicating the context ID ("running context number") of the currently running context to the line 7 connected to a control input of the multiplexer 8).

FIG. 4 shows a schematic representation of one of the context status elements 4a illustrated in FIG. 3.

The context status element 4a comprises two registers 9a, 9b, namely a register 9a for storing the context status information, and a register 9b for storing the attribute information.

The register 9a comprises at least one bit which indicates whether the respective context status element 4a (or the corresponding context) is "free" or occupied ("not free") (i.e. occupied by a corresponding thread or not ("occupied" bit).

If the thread list scheduler 2 determines that a context status element 4a (or the corresponding context) is "free" (i.e. if the "occupied" bit is in a status indicating such a status (e.g. a non-set status), the thread list scheduler 2 may load a thread on the context, and the "occupied" bit may then be set (as well as a further status bit marking the thread as being in the above-mentioned status "ready").

Furthermore, the thread list scheduler 2 stores the corresponding attribute information for the newly loaded thread in the context status array memory 4, in particular in the register 9b of the corresponding context status element 4a.

The status of the above-mentioned "ready" bit is queried by the context scheduler 3. The context scheduler 3 selects the next context or thread, respectively, that is running or to be executed by the CPU core 11, respectively, among those contexts or threads that are marked as being in the status "ready" by a "ready" bit set.

The condition checker 20 illustrated in FIG. 4 serves to filter out from corresponding external events (or signals representing same) those that change the status of the corresponding context. This happens in correspondence with the attribute information stored in the register 9b for the corresponding thread, and the current context status.

Figure 5:
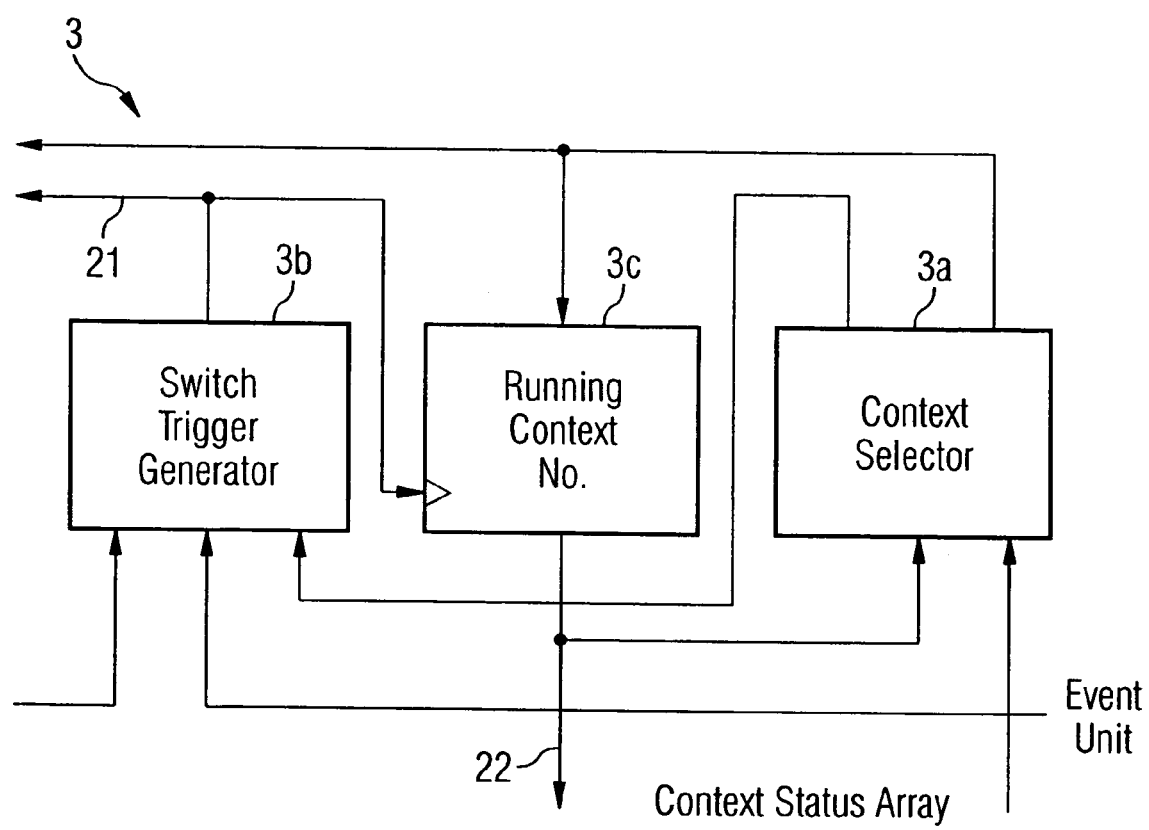
FIG. 5 a schematic representation of the context scheduler illustrated in FIG. 2.

FIG. 5 shows a schematic representation of the context scheduler 3 illustrated in FIG. 2.

It comprises a context selector 3a and a switch trigger generator 3b.

The context selector 3a selects among the contexts being in the status "ready" the context that has to be executed next by the CPU core 11 or that is running next, respectively, e.g. in accordance with a "round robin" selection method.

The round robin selection method may take place without weighting the candidate contexts; alternatively, a weighting of the contexts may also take place in the round robin selection method, e.g. by using the above-mentioned attribute information, e.g. by taking into account the thread priority, the pre-emption property, etc.

Alternatively, any other selection method may also be used, e.g. a selection method in which a maximum running time is specified for each context, said running time being taken into account for the context selection.

If a new context is selected, the switch trigger generator 3b generates a switch trigger signal that is fed to the CPU core 11 and to a context ID memory 3c (e.g. via a line 21). The context or thread, respectively, selected by the context selector 3a is then made available to the CPU core 11 for direct execution there, and the context ID ("running context number") stored in the context ID memory 3c is updated such that it corresponds to the number or ID of the respectively running (newly selected) context (and the context ID of the newly selected or loaded context is transmitted to the context status array memory 4 via a line 22).

Figure 6:
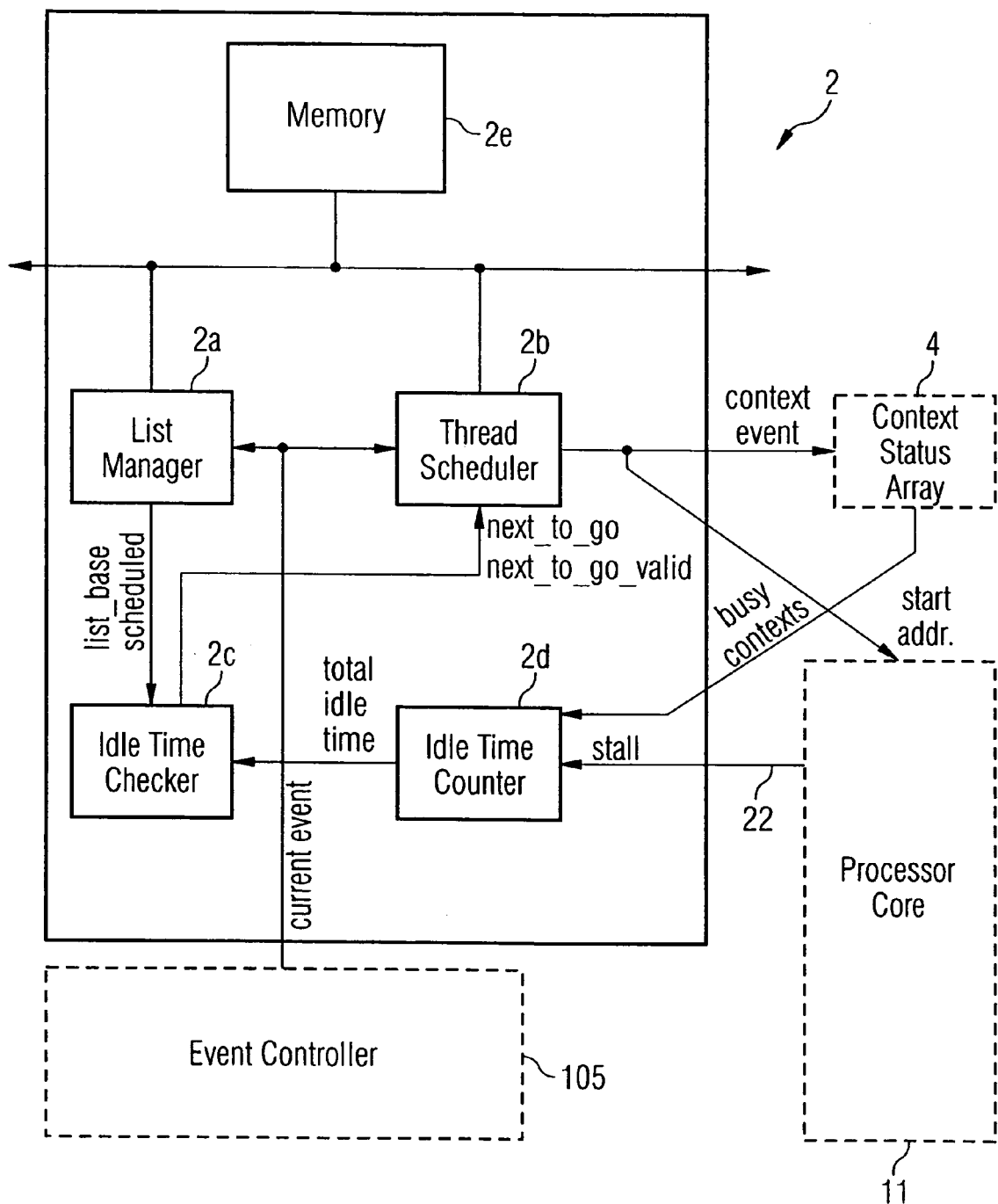
FIG. 6 a schematic representation of the thread list scheduler illustrated in FIG. 2.

FIG. 6 shows a schematic representation of the thread list scheduler 2 illustrated in FIG. 2.

It comprises a list manager 2a, a thread scheduler 2b, an idle time checker 2c, and an idle time counter 2d.

The list manager 2a, the thread scheduler 2b, the idle time checker 2c, and the idle time counter 2d are responsible for the thread scheduling of threads that are buffered in the memory 2e—which has already been mentioned briefly above—of the thread list scheduler 2 and that have to be executed.

The threads stored in the memory 2e—e.g. in a corresponding list—, or their attribute information, respectively, may be changed or processed in reaction to particular events or to signals indicating particular events, respectively. If an event relates to a thread that is already in the status "running", the signal indicating the corresponding event is transmitted by an event controller 105 to the context scheduler 3. Otherwise, the attribute information of the respective thread which is stored in the memory 2e is updated by means of the list manager 2a in correspondence with the respective event.

For controlling the thread list scheduler 2, the following variables—that are implemented in hardware registers—may be used:

list_base.status:
in the status "true" if the next in-order thread is ready for running, otherwise in the status "false"

list_base.adr:
address of the list entry containing the thread data of the next in-order thread list_base.attributes:
attributes of the thread entry of the next in-order thread; buffered locally for reasons of efficiency scheduled.status
in the status "true" if the next out-of-order thread is ready for running, otherwise in the status "false"

scheduled.adr:
address of the list entry containing the corresponding thread data of the corresponding (out-of-order) threads scheduled.threshold:
idle time threshold value scheduled.prev
address of the last entry in "scheduled.adr"

scheduled.attributes
attributes of the corresponding thread entry of the corresponding out-of-order thread; buffered locally for reasons of efficiency The list manager 2a is triggered by an appropriate event (or by a signal indicating an appropriate event, respectively).

In reaction thereto, the list manager 2a walks—in a particular order—(i.e. "in-order") through the thread list stored in the memory 2e, e.g. from the base thread entry ("base") to the top thread entry ("top"). Alternatively, the list manager 2a may inspect the threads stored in the thread list also in some other—also predetermined—order (i.e. also "in-order" then).

Figure 7:
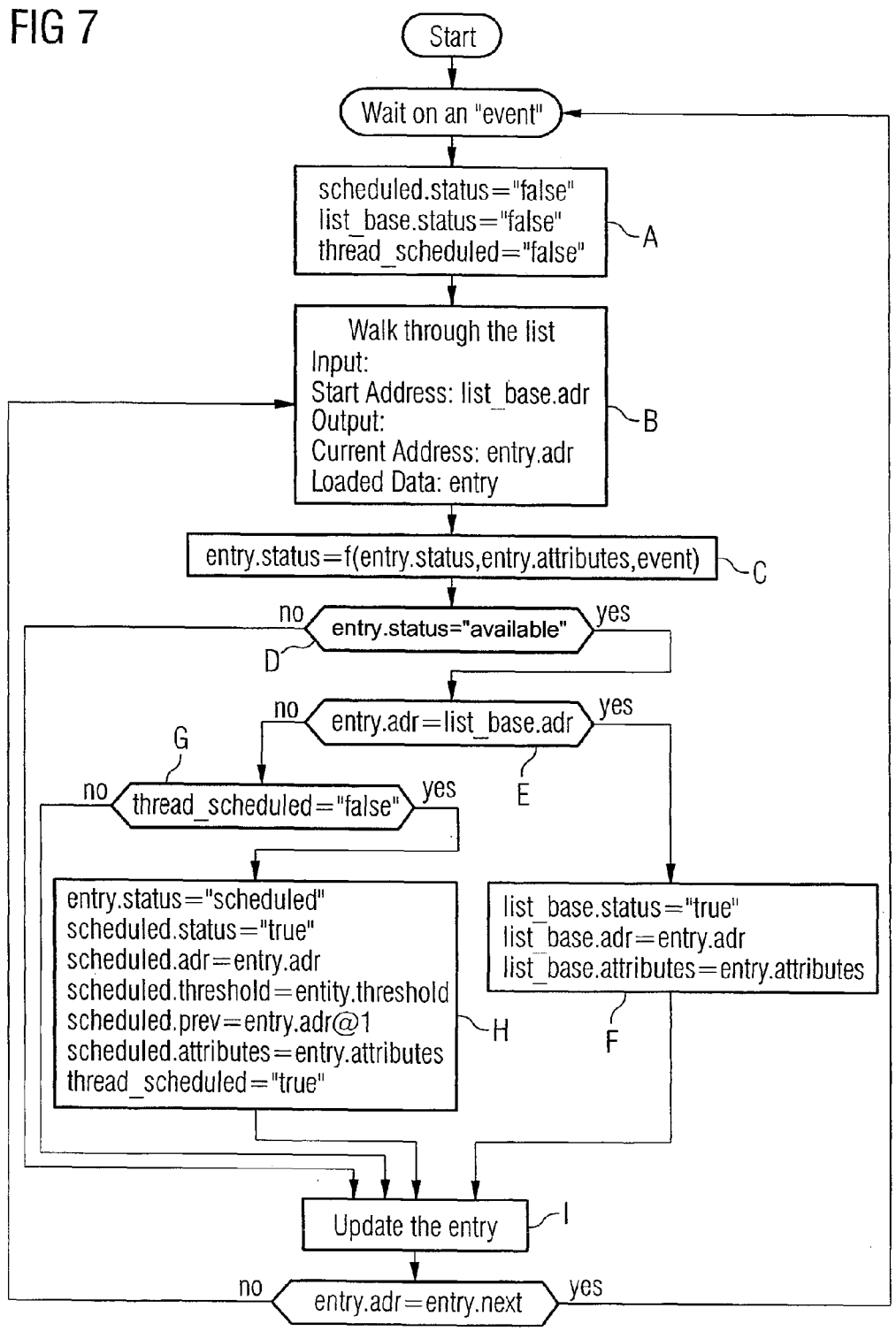
FIG. 7 a schematic representation of method steps performed by the list manager illustrated in FIG. 6.

FIG. 7 shows a more detailed schematic representation of method steps performed by the list manager 2a.

As results from FIG. 7, in reaction to the triggering of the list manager 2a caused by the above-mentioned event, the above-mentioned variables list_base.status and scheduled-.status as well as a variable thread_scheduled are first of all taken to a status "false" (step A).

Subsequently—as has been described above—the thread list stored in the memory 2e is walked through "in-order" (e.g. from bottom to top) (i.e. successively through the threads contained in the thread list, wherein—successively—one thread after the other is examined) (step B).

Next, the effect of the above-mentioned event on the respective threads, in particular their status (entry.status) can be calculated (optionally), wherein the new status results from a function f(entry.status, entry.attributes, event) taking into account the old thread status, the event, and the respective thread attributes (step C).

After the updating of the thread status information performed in step C, it is checked whether the respective thread is in an available status ("available") (step D).

If yes (entry.status="available"), it is checked whether the respective thread is the first of the threads contained in the thread list (i.e. is at the base in the above-mentioned thread list) (step E).

If yes (entry.adr=list_base.adr), the corresponding thread is taken to a status ready for running ("pending for running") and—in a step F—the above-mentioned variable list_base.status is taken to a status "true" (and list_base.adr is set to entry.addr and list_base.attributes to entry.attributes). As soon as a context has become free, the thread scheduler 2b performs a scheduling for the corresponding thread.

If, in the above-mentioned step E, it is determined that the respective thread is not the first of the threads contained in the thread list (i.e. if entry.adr≠list_base.adr applies), it is checked whether a corresponding (out-of-order) scheduling has already been performed for other, subsequent threads (step G).

If not, i.e. if thread_scheduled="false" applies, the corresponding thread is (newly) considered as a candidate for an out-of-order scheduling.

For a thread that is considered as an out-of-order schedule candidate, the thread scheduler 2b performs a scheduling for the corresponding thread if the total idle time of the processor is larger than the idle time threshold value assigned to the respective thread.

With the method described here, it is only the first thread (viewed from the base) following the very first thread of the threads contained in the thread list and being in an available status ("available") that is considered as a candidate for an out-of-order scheduling.

Alternatively, any other scheduling methods may also be used, for instance, methods in which—if the first thread contained in the thread list and following the very first thread is not in an available status ("available")—among all the remaining threads in which the respective idle time threshold value is smaller than the total idle time of the processor, that thread (or those threads) is/are selected as out-of-order scheduling candidate(s) for which the idle time threshold value is smallest.

After the selection of an appropriate out-of-order scheduling candidate, the above-mentioned variable entry_status is taken to a status "scheduled", the variable scheduled.status to a status "true", etc. in step H (cf. FIG. 7).

At the end of the scheduling method illustrated here, the variable "scheduled" receives the (first) out-of-order thread to be subject to an (out-of-order) scheduling, and the variable "list_base" the base thread in the list that is to be subject to an (in-order) scheduling.

The list entries that have possibly been changed in accordance with the above-mentioned algorithm are rewritten to the above-mentioned thread list stored in the memory 2e (step I).

In order to additionally incorporate threads in the list, or to cancel threads from the list, a signal indicating a corresponding "update" event is generated by the CPU core 11. The list manager 2a then walks—correspondingly as described above "in-order"—through the thread list stored in the memory 2e and provides for the appropriate changes (cancellations from the list) and/or supplements (additional incorporation in the list).

Figure 8:
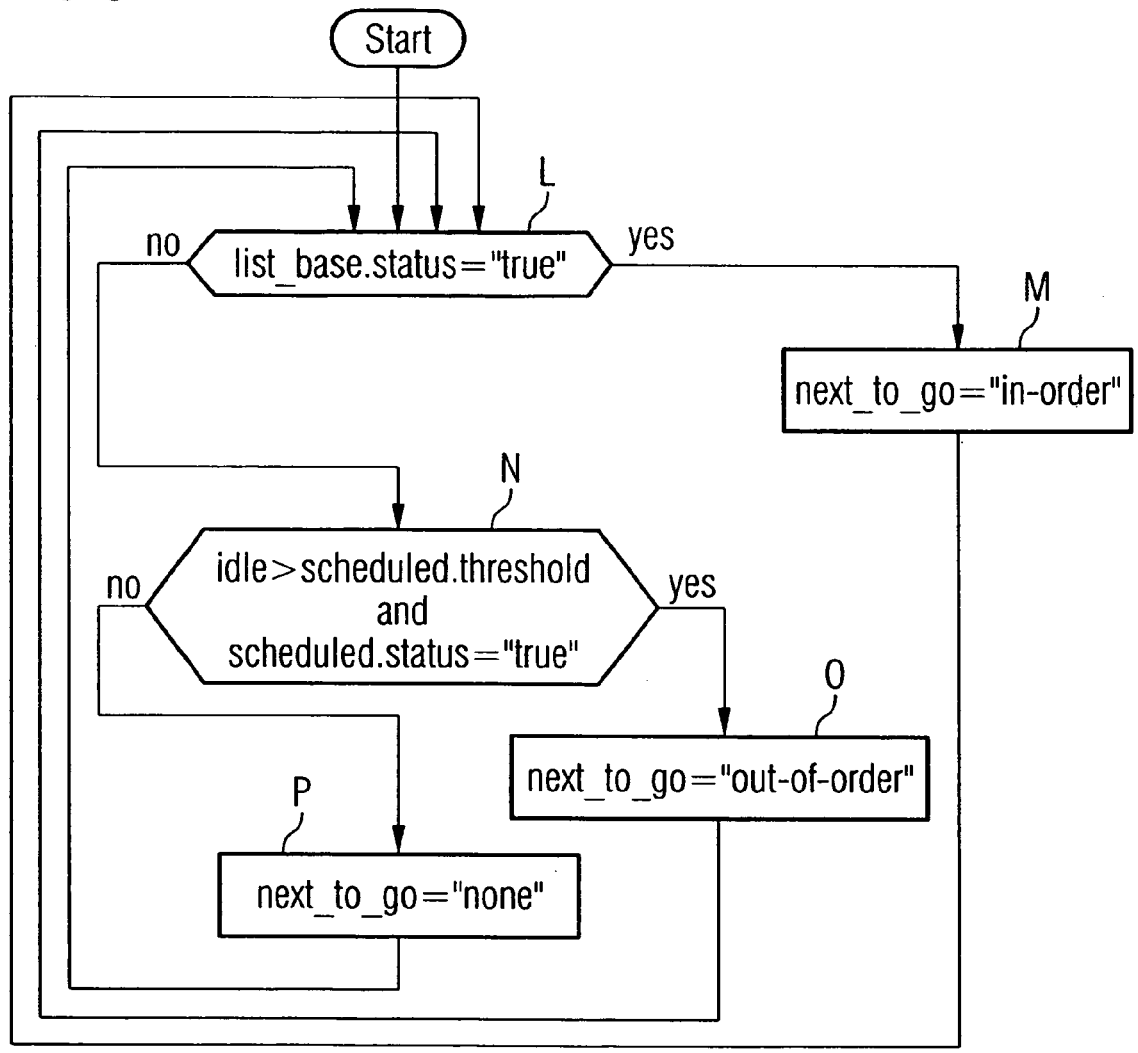
FIG. 8 a schematic representation of method steps performed by the idle time checker illustrated in FIG. 6.

FIG. 8 shows a schematic representation of method steps performed by the idle time checker 2c illustrated in FIG. 6.

By means of the idle time checker 2c it is determined whether, for a thread which is in the ready status and which follows an in-order thread which is at the base in the thread list and is in the non-ready status, an (out-of-order) scheduling is to be performed prior to the in-order thread.

In a first step L, the idle time checker 2c queries the status of the above-mentioned variable list_base.status. If this variable is in the status "true", it is determined that the in-order thread which is at the base in the thread list is the next one to be subject to a scheduling. Accordingly, a variable "next-to-go" is assigned a value "in-order"—standing for the in-order thread that is at the base in the thread list (step M).

If, in the above-mentioned step L, it is determined that the above-mentioned variable list_base.status is in the status "false", it is determined in a step N whether the out-of-order thread which follows the in-order thread that is at the base in the thread list is in a status ready for running (i.e. whether the variable scheduled.status is in a status "true), and whether the idle time of the processor or of the CPU core 11, respectively, is larger than the idle time threshold value assigned to the respective thread (i.e. whether a variable "idle" is larger than the variable scheduled.threshold).

If yes, it is determined that the thread following the in-order thread which is at the base in the thread list is to be subject to an (out-of-order) scheduling. Accordingly, the variable "next-to-go" is assigned a value "out-of-order"—standing for the out-of-order thread following the in-order-thread which is at the base in the thread list (step O).

If no (i.e. if the variable scheduled.status is in a status "false", or if the variable idle is smaller or equal to the variable scheduled.threshold), it is determined that (for the time being) no thread has to be subject to a scheduling. Accordingly, a value "none" characterizing this is assigned to the variable "next-to-go" (step P).

It is thus indicated by means of the "next-to-go" variable whether the next thread to be executed and to be subject to a scheduling is to be selected as indicated by the variable "list-base" (next-to-go=in-order), or as indicated by the variable "scheduled" (next-to-go=out-of-order), or whether (for the time being) no thread is to be subject to a scheduling (next-to-go=none).

By means of the above-mentioned variable "idle", the total idle time of the processor or of the CPU core 1, respectively, is indicated. The value of the variable "idle" is determined by the idle time counter 2d and is provided to the idle time checker 2c.

The idle time counter 2d comprises a counter—providing the variable "idle"—, said counter being reset to "Zero" whenever a new thread has been subject to a scheduling or has been loaded, respectively, by the thread list scheduler 2 or the thread scheduler 2b, in particular when a new thread has been assigned to a corresponding, free context.

The counter is then (and as long as lasting continuously, e.g. at each rising (and/or falling) clock edge) incremented if (or as long as) at least one free context is available and the processor or the CPU core 11, respectively, is in a "stall" status (which is indicated to the idle time counter 2d by the CPU core 11 by a corresponding stall signal output at a line 22).

The thread scheduler 2b assigns the thread that is the next one to be subject to a scheduling by the above-mentioned variable next_to_go to the next free context (i.e. updates its status and attributes in the context array memory 4), provides for an appropriate initiating of the program counter (PC), and cancels the corresponding thread from the above-mentioned thread list.

Furthermore, the thread scheduler 2b causes a corresponding (cache) buffering of the attributes of the corresponding thread and transmits the corresponding signals to the context scheduler 3 if a corresponding event (or signals representing same) necessitates the performing of an action with the corresponding thread.

A schematic, more detailed representation of corresponding processes ("process 1, "process 2", and "process 3") performed by the thread scheduler 2b illustrated in FIG. 6 is shown in FIG. 9.

LIST OF REFERENCE SIGNS 2 thread list scheduler
2a list manager 2b thread scheduler
2c idle time checker
2d idle time counter
2e memory
3 context scheduler
3a context selector
3b switch trigger generator
3c context ID memory
4 context status array memory
4a context status element
4b context status element
4c context status element
4d context status element
5 event controller
6 line
7 line
8 multiplexer
9a register
9b register
10 microprocessor system
11 CPU
12 memory controller
15 microchip
16 system bus
17 memory
18 memory
20 condition checker
21 line
22 line
105 event controller

What is claimed is:

1. A thread scheduling method comprising:
performing a scheduling for threads on a thread list to be executed by a multithreaded processor, wherein
the scheduling is performed as a function of a variable representing an idle time of the processor,
a first thread on the thread list is designated as a next in-order thread,
a second thread on the thread list is designated as a next out-of-order thread and the first thread precedes the second thread in the thread list,
the second thread is loaded into the processor for execution before the first thread if the first thread is not yet in an available status, if the second thread is in an available status, and if the variable representing the idle time is larger than an idle time threshold value assigned to the second thread, and
idle time thresholds are assigned individually to each thread in the thread list to be executed by the processor and loaded individually for each respective thread into a hardware register controlling a thread scheduler.

2. The thread scheduling method according to claim 1, further comprising resetting the variable representing the idle time of the processor when a thread is scheduled.

3. The thread scheduling method according to claim 1, wherein the variable representing the idle time of the processor is incremented if the processor is in an idle state and if a free context is available.

4. The thread scheduling method according to claim 1, further comprising assigning the second thread a free context.

5. The thread scheduling method according to claim 4, wherein a further scheduling, in particular an on-core scheduling, is performed for threads loaded into the processor.

6. The thread scheduling method of claim 1, wherein a thread on the thread list with a shortest idle time threshold compared to other threads in the thread list is selected as a next thread to be loaded into the processor for execution.

7. The thread scheduling method of claim 1, wherein performing the scheduling for the threads comprises determining which threads are to be loaded into the multithreaded processor.

8. A device for controlling threads on a multithreaded processor, the device comprising:
an idle time counter storing a variable representing an idle time of the processor; and
a thread scheduler configured to schedule threads on a thread list to be executed by the multithreaded processor, wherein
the thread scheduler designates a first thread on the thread list as a next in-order thread,
the thread scheduler designates a second thread on the thread list as a next out-of-order thread,
the first thread precedes the second thread in the thread list,
the second thread is loaded into the processor for execution before the first thread if the first thread is not yet in an available status, if the second thread is in an available status, and if the variable representing the idle time of the processor is larger than an idle time threshold value assigned to the second thread, and
idle time thresholds are assigned individually to each thread in the thread list to be executed by the processor and loaded individually for each respective thread into a hardware register controlling the thread scheduler.

9. A scheduler for a multithreaded processor, the scheduler comprising:
an idle time counter comprising an output representing an idle time of the processor;
a list manager comprising a list of threads to be executed by the processor stored in a memory and a corresponding idle time threshold for each thread, wherein the list of threads comprises a first thread entry and a second thread entry, the first thread being ahead of the second entry in the list of threads;
an idle time checker comparing the output representing the idle time of the processor with an idle time threshold for the second thread; and
a thread scheduler loading the second thread into the processor for execution before the first thread if a set of conditions are met, the set of conditions comprising the first thread being not yet in an available status, if the second thread being in an available status, and the output representing the idle time of the processor being greater than the idle time threshold for the second thread, wherein idle time thresholds are assigned individually to each thread in the list of threads to be executed by the processor and loaded individually for each respective thread into a hardware register controlling the thread scheduler.

10. The scheduler of claim 9, wherein:
the list manager further comprises a corresponding first status designator for each thread, wherein the first status designator indicates whether a thread is available for next-in-order execution; and
the set of conditions further comprises the first status designator for the first thread indicating that the first thread is not available for next-in-order execution.

11. The scheduler of claim 9, wherein:
the list manager further comprises a corresponding second status designator for each thread, wherein the second status designator indicates that a thread is available for out-of-order execution; and
the set of conditions further comprises the second status designator for the second thread indicating that the second thread is available for out-of-order execution.

12. The scheduler of claim 9, wherein the idle time counter is reset whenever a thread is loaded into the processor.

13. The scheduler of claim 9, further comprising a context scheduler for scheduling a context for each thread loaded on the processor.

14. The scheduler of claim 9, wherein the list manager is configured to process the list of threads in a predetermined order.

15. The scheduler of claim 9, wherein:
the list manager further comprises
a corresponding first status designator for each thread, wherein the first status designator indicates that a thread is available for next-in-order execution, and
a corresponding second status designator for each thread, wherein the second status designator indicates that a thread is available for out-of-order execution; and
the set of conditions further comprises
the first status designator for the first thread indicating that the first thread is not available for next-in-order execution, and
the second status designator for the second thread indicating that the second thread is available for out-in-order execution.

16. The scheduler of claim 9, wherein the scheduler is triggered by events taking place within a core of the processor.

17. The scheduler of claim 9, wherein the scheduler is configured to check a status of each thread in the list of threads.

18. The scheduler of claim 9, wherein a thread on the list of threads with a shortest idle time threshold compared to other threads in the list of threads is selected as a next thread to be loaded into the processor for execution.

19. A device for scheduling threads on a multithreaded processor, the device comprising:
an idle time counter detecting an idle time of the processor; and
a thread scheduler configured to perform an out-of-order scheduling of an out-of-order thread for execution on the processor if a next in-order thread is not yet in an available status, if the out-of-order thread is in an available status, and if the detected idle time of the processor is greater than an idle time threshold assigned to the out-of-order thread, wherein an idle time threshold is assigned to each thread to be scheduled on the processor and loaded individually for a respective thread into a hardware register controlling the thread scheduler.

* * * * *